United States Patent
Deshmukh et al.

(10) Patent No.: US 11,144,721 B2
(45) Date of Patent: Oct. 12, 2021

(54) SYSTEM AND METHOD FOR TRANSFORMING UNSTRUCTURED TEXT INTO STRUCTURED FORM

(71) Applicant: Accenture Global Solutions Limited, Dublin (IE)

(72) Inventors: Jayati Deshmukh, Bangalore (IN); Annervaz K. M., Bangalore (IN); Shubhashis Sengupta, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 174 days.

(21) Appl. No.: 16/428,320

(22) Filed: May 31, 2019

(65) Prior Publication Data
US 2020/0380072 A1    Dec. 3, 2020

(51) Int. Cl.
*G06F 40/20* (2020.01)
*G06F 40/253* (2020.01)
*G06N 3/08* (2006.01)
*G06N 3/04* (2006.01)
*G06F 16/383* (2019.01)
*G06F 40/268* (2020.01)
*G06F 40/30* (2020.01)
*G06F 40/211* (2020.01)
*G10L 25/30* (2013.01)

(52) U.S. Cl.
CPC .......... *G06F 40/253* (2020.01); *G06F 16/383* (2019.01); *G06N 3/0445* (2013.01); *G06N 3/084* (2013.01); *G06F 40/20* (2020.01); *G06F 40/211* (2020.01); *G06F 40/268* (2020.01); *G06F 40/30* (2020.01); *G10L 25/30* (2013.01)

(58) Field of Classification Search
None
See application file for complete search history.

(56) References Cited

U.S. PATENT DOCUMENTS

| | | | |
|---|---|---|---|
| 10,410,118 B2 * | 9/2019 | Xiong | G06N 3/08 |
| 10,817,509 B2 * | 10/2020 | Korpusik | G06F 16/284 |
| 2017/0286397 A1 * | 10/2017 | Gonzalez | G06F 40/35 |
| 2017/0357896 A1 * | 12/2017 | Tsatsin | G06N 3/0454 |
| 2018/0121799 A1 * | 5/2018 | Hashimoto | G06F 40/253 |
| 2018/0329883 A1 * | 11/2018 | Leidner | G06F 16/2237 |
| 2019/0220748 A1 * | 7/2019 | Denil | G06N 3/084 |
| 2019/0228073 A1 * | 7/2019 | Chatterjee | G06F 40/216 |
| 2019/0228099 A1 * | 7/2019 | Bajaj | G06N 3/08 |
| 2020/0258497 A1 * | 8/2020 | Chen | G06F 40/20 |
| 2020/0312306 A1 * | 10/2020 | Moritz | G06N 3/0454 |

(Continued)

OTHER PUBLICATIONS

Lin et al., "A structured Self-Attentive Sentence Embedding", ICLR 2017, pp. 1-10, Mar. 9, 2017.*

(Continued)

*Primary Examiner* — Richard Z Zhu
(74) *Attorney, Agent, or Firm* — Plumsea Law Group, LLC

(57) ABSTRACT

A system and method for transforming unstructured text into structured form is disclosed. The system and method include converting an input word sequence (e.g., sentence) into tagged output which can be then easily be converted into a structured format. The system may include a bidirectional recurrent neural network that can generate multiple labels of individual words or phrases. In some embodiments, a customized learning loss equation involving set similarity is used to generate the multiple labels.

20 Claims, 5 Drawing Sheets

(56) References Cited

U.S. PATENT DOCUMENTS

2020/0327886 A1* 10/2020 Shalaby .................. G10L 15/22
2020/0364409 A1* 11/2020 Perez ..................... G06N 20/00

OTHER PUBLICATIONS

K.M. Annervaz et al. "A Generic Platform to Automate Legal Knowledge Work Process Using Machine Learning", published Dec. 2015; 2015 IEEE 14th Internaitonal Conference on Machine Learning and Applications, Miami, FL, USA; https://ieeexplore.ieee.org/abstract/document/7424344.pdf.

Martin Atzmueller et al. "Rule-Based Information Extraction for Structured Data Acquisition using TEXTMARKER", published Jan. 2008; Wurzburg, Germany; https://citeseerx.ist.psu.edu/viewdoc/download?doi-10.1.1.396.93968,rep=rep1&type=pdf.

Dzmitry Bandanau et al. "Neural Machine Translation by Jointly Learning to Align and Translate", published May 19, 2016; https://https://arxiv.org/pdf/1409.0473.pdf.

Kyunghyun Cho et al. "Learning Phrase Representations Using RNN Encoder-Decoder for Statistical Machine Translation", published Sep. 3, 2014; https://https://arxiv.org/pdf/1406.1078.pdf.

Chorowski et al., "Attention-Based Models for SPeech Recognition", published Jun. 24, 2015; https://arxiv.org/pdf/1506.07503.pdf.

Aron Culotta et al. "Dependency Tree Kernels for Relation Extraction", published Jul. 2004; barcelona, Spain; https://www.aclweb.org/anthology/P04-1054/.

Data Never Sleeps 5.0 (2017), https://www.domo.com/learn/data-never-sleeps-5 [retrieved Dec. 4, 2019].

Li Dong et al. "Language to Logical form With Neural Attention", published Jun. 6, 2016; https://arxiv.org/pdf/1601.01280.pdf.

Katrin Fundel et al., "RelEx—Relation extraction using dependency parse trees", published Feb. 1, 2007; https://academic.oup.com/bioinformatics/article/23/3/365/236564.

Jonas Gehring et al., "Convolutional Sequence to Sequence Learning", published Jul. 25, 2017; https://arxiv.org/pdf/1705.03122.pdf.

Kazuma Hashimoto et al., "A Joint Many-Task Model: Growing a Neural Network for Multiple NLP Tasks", published Jul. 24, 2017; https://arxiv.org/pdf/1611.01587.pdf.

Zhiheng Huang, "Bidirectional LSTM-CRF Models for Sequence Tagging", published Aug. 9, 2015; https://arxiv.org/pdf/1508.01991.pdf.

Ryan Kiros, "Unifying Visual-Semantic Embeddings with Multimodal Neural Language Models", published Nov. 10, 2014; https://arxiv.org/pdf/1411.2539.pdf.

John Lafferty, "Conditional Random Fields: Probabilistic Models for Segmenting and Labeling Sequence Data", published Jun. 28, 2001; https://repository.upenn.edu/cgi/viewcontent.cgi?article=1162&context=cis_papers.

Remi Lebret et al., "Neural Text Generation from Structured Data with Application to the Biography Domain", published Sep. 23, 2016; https://arxiv.org/pdf/1603.07771.pdf.

Anutosh Maitra et al., "A Novel Text Analysis Platform for Pharmacovigilance of Clinical Drugs", published 2014; https://core.ac.uk/download/pdf/82006685.pdf.

Makoto Miwa et al., "End-to-End Relation Extraction using LSTMs on Sequences and Tree Structures", published Aug. 2016; https://www.aclweb.org/anthology/P16-1105.pdf.

Frank Reichartz et al., "Dependency Tree Kernels for Relation Extraction From Natural Language Text", https://pdfs.semanticscholar.org/646c/c361c4a3b710a908cd065346bff9b0f963cb.pdf [retrieved Dec. 4, 2019].

Alexander M. Rush et al., "A Neural Attention Model for Abstractive Sentence Summarization", published Sep. 2015; https://www.aclweb.org/anthology/D15-1044.pdf.

Nitish Srivastava et al., "Unsupervised Learning of Video Representations using LSTMs", published Jan. 4, 2016; https://arxiv.org/pdf/1502.04681.pdf.

Ilya Sutskever et al., "Sequence to Sequence Learning with Neural Networks", published Sep. 10, 2014; https://papers.nips.cc/paper/5346-sequence-to-sequence-learning-with-neural-networks.pdf.

Subhashini Venugopalan et al., "Translating Videos to Natural Language Using Deep Recurrent Neural Networks", published May-Jun. 2015; https://www.cs.utexas.edu/users/ml/papers/venugopalan.naacl15.pdf.

Oriol Vinyals et al., Show and Tell: A Neural Image Caption Generator:, published Apr. 20, 2015; https://arxiv.org/pdf/1411.4555.pdf.

Yonghui Wu et al., "Google's Neural Machine Translation System: Bridging the Gap between Human and Machine Translation", published Oct. 8, 2016; https://arxiv.org/pdf/1609.08144.pdf.

Li Yao et al., "Describing Videos by Exploiting Temporal Structure", published Oct. 1, 2015; https://arxiv.org/pdf/1502.08029.pdf.

* cited by examiner

SYSTEM AND METHOD FOR TRANSFORMING UNSTRUCTURED TEXT INTO STRUCTURED FORM

TECHNICAL FIELD

The present disclosure generally relates to transforming unstructured text into structured form. More specifically, the present disclosure generally relates to a system and method for transforming unstructured text into structured form.

BACKGROUND

Textual data is often available in the form of documents, which can be used for a variety of purposes, such as documentation, reports, surveys, and logs, etc. The text in many documents is unstructured. Typically, unstructured data is mostly useful only after extracting key information in a structured form. However, extracting key information from unstructured text is subject to many errors. Additionally, applying only one label per word found within unstructured text can only give a piece of the information the unstructured text yields. For example, if a biography states, "John Doe was born to German parents, and speaks German fluently," and the word "German" is only labeled as a nationality, it would be missed that John Doe speaks the German language.

There is a need in the art for a system and method that addresses the shortcomings discussed above.

SUMMARY

A system and method for transforming unstructured text into structured form is disclosed. The system and method include converting an input word sequence (e.g., sentence) into tagged output which can be then easily be converted into a structured format.

The disclosed system and method improve the accuracy of the results of transforming unstructured text into structured form by using a bidirectional recurrent neural network ("RNN"). The bidirectional RNN processes the input in a forward direction and in a backward direction, both with respect to time and the order of a word sequence that is received as an input. This type of bidirectional processing provides more context for each word or phrase input into the bidirectional RNN, thus helping with determining which, if any, label is appropriate for each word or phrase. The disclosed system and method further improve the accuracy of the results of transforming unstructured text into structured form by providing as input to the bidirectional RNN a word (or word embedding) and its corresponding part-of-speech ("POS") (or POS tag embedding). The word and its corresponding POS provide more context for each word, again helping with determining which, if any, label is appropriate for each word. In some embodiments, the disclosed system and method can generate multiple labels of individual words or phrases using a customized learning loss equation involving set similarity. Generating multiple labels can help provide more information in a structured form, since words may have different meaning depending upon how the words are used. The customized learning loss equation is a reason why multiple labels can be predicted using the disclosed method.

In some embodiments, the structured format may contain only applicable information. In other words, pronouns, articles, and other generic information may be filtered out and excluded from the structured format. Distilling the unstructured text into applicable information in a structured format enables easier, more efficient analysis, processing and/or use of the applicable information.

The transformation of unstructured data to a structured form can help businesses in certain domains. For example, in Pharmacovigilance, where adverse effects of prescribed drugs are reported by patients or medical practitioners, this information can be used to detect signals of adverse effects. Collection, analysis, and reporting of these adverse effects by the drug companies is mandated by law. In most cases, it is easy for patients or medical practitioners to describe the side-effects of their drugs in a common, day-to-day language, in free form text. However, this free form text is difficult to extract information from. Thus, transforming the free form text into a structured format enables easier processing of information, e.g. statistical analysis of structured data for signals of adverse effects.

Another domain that can benefit from transforming unstructured data into a structured form is the management of legal contracts, e.g. lease agreements in real estate. Lease agreements can be lengthy documents that are difficult to compare to one another. Accordingly, transforming the text of a lease agreement into a structured format can allow easier comparison of the terms of different lease agreements. This structured information can be further used for aggregate analytics and decision making by large real estate firms.

In one aspect, the disclosure provides a method of transforming unstructured text into structured form. The method may include obtaining a word sequence, including at least a first word and a second word. The method may further include obtaining a first word embedding and a first POS tag embedding both corresponding to the first word. The method may include obtaining a second word embedding and a second POS tag embedding both corresponding to the second word. The method may include concatenating the first word embedding with the first POS word embedding into a first input and the second word embedding with the second POS word embedding into a second input. The method may include using self-attention to process the first input and the second input through a bidirectional recurrent neural network RNN to generate a first output corresponding to the first input and a second output corresponding to the second input, wherein the first output includes at least two labels corresponding to the first word.

In another aspect, the disclosure provides a non-transitory computer-readable medium storing software that may comprise instructions executable by one or more computers which, upon such execution, may cause the one or more computers to transforming unstructured text into structured form by: obtaining a first word embedding and a first POS tag embedding both corresponding to the first word; obtaining a second word embedding and a second POS tag embedding both corresponding to the second word; concatenating the first word embedding with the first POS word embedding into a first input and the second word embedding with the second POS word embedding into a second input; and using self-attention to process the first input and the second input through a bidirectional RNN to generate a first output corresponding to the first input and a second output corresponding to the second input, wherein the first output includes at least two labels corresponding to the first word.

In another aspect, the disclosure provides a system for transforming unstructured text into structured form, comprising one or more computers and one or more storage devices storing instructions that may be operable, when executed by the one or more computers, to cause the one or more computers to: obtain a word sequence, including at least a first word and a second word; obtain a first word embedding and a first POS tag embedding both corresponding to the first word; obtain a second word embedding and a second POS tag embedding both corresponding to the second word; concatenate the first word embedding with the first POS word embedding into a first input and the second word embedding with the second POS word embedding into a second input; and use self-attention to process the first input and the second input through a bidirectional RNN to generate a first output corresponding to the first input and a second output corresponding to the second input, wherein the first output includes at least two labels corresponding to the first word.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
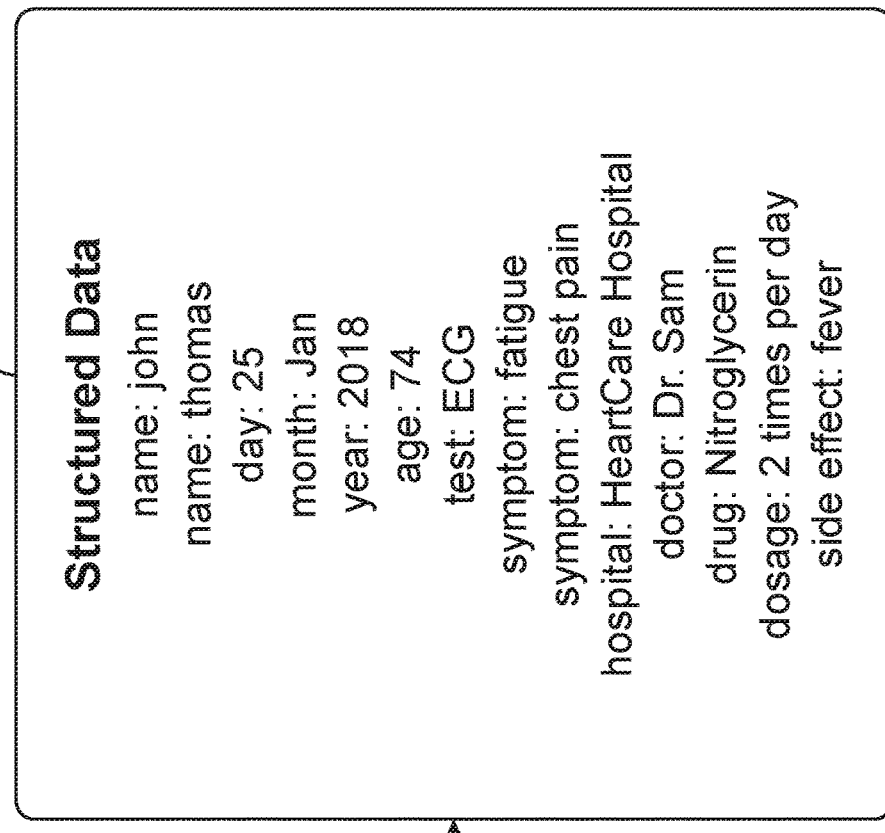
FIG. 1 is a schematic diagram of an example of unstructured text and structured information.
Figure 1:
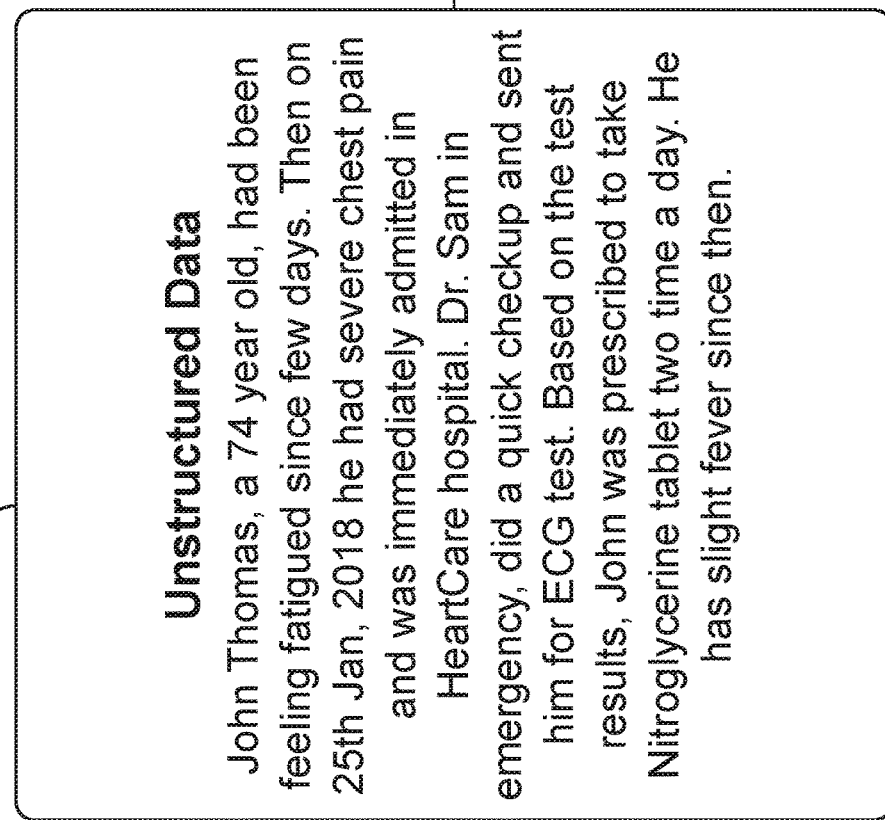

To demonstrate how unstructured data can be more useful when transformed into structured data, FIG. 1 shows an example of unstructured text 100 and structured information 102. Unstructured text 100 in this example includes a medical practitioner's free form notes about a patient named John Thomas. Structured data 102 includes the information from unstructured text 100 in a structured format. As one can see, unstructured text 100 is difficult to quickly extract certain information from visually. For example, one would need to read through several lines of text before finding out that the patient had an ECG test. The same information about the ECG test could be found quicker by visually scanning structured data 102. In this particular example, structured data 102 is in a format where a label or category is listed first with a colon and the word or phrase corresponding to the label or category is listed after the colon. In other embodiments, the structured data may be displayed in a different format. For example, a table may include a column for the label or category and another column for the word or phrase corresponding to the label or category.

Figure 2:
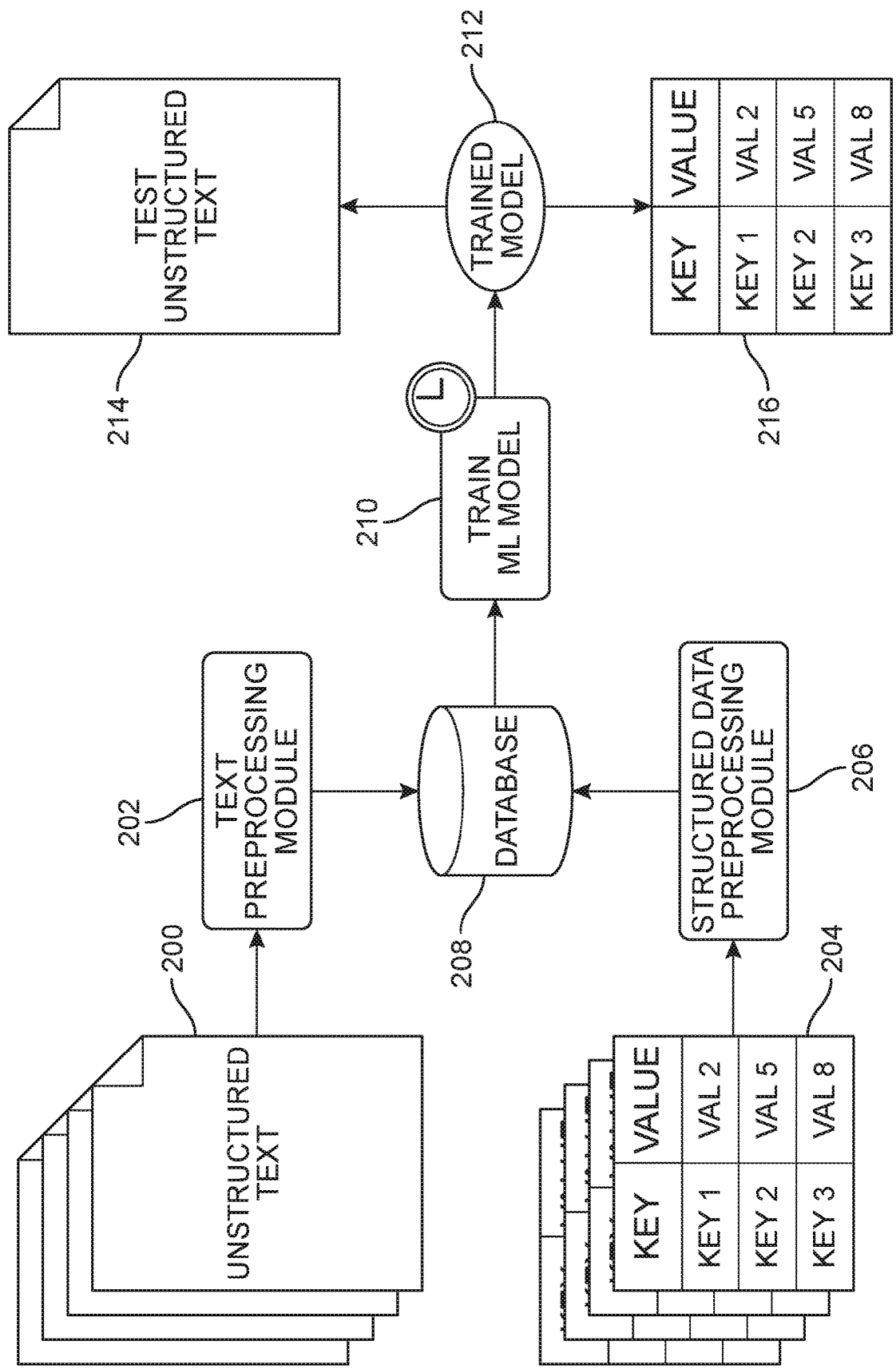
FIG. 2 is a schematic diagram of an embodiment of a process used to train a system for transforming unstructured text into structured form.
Figure 3:
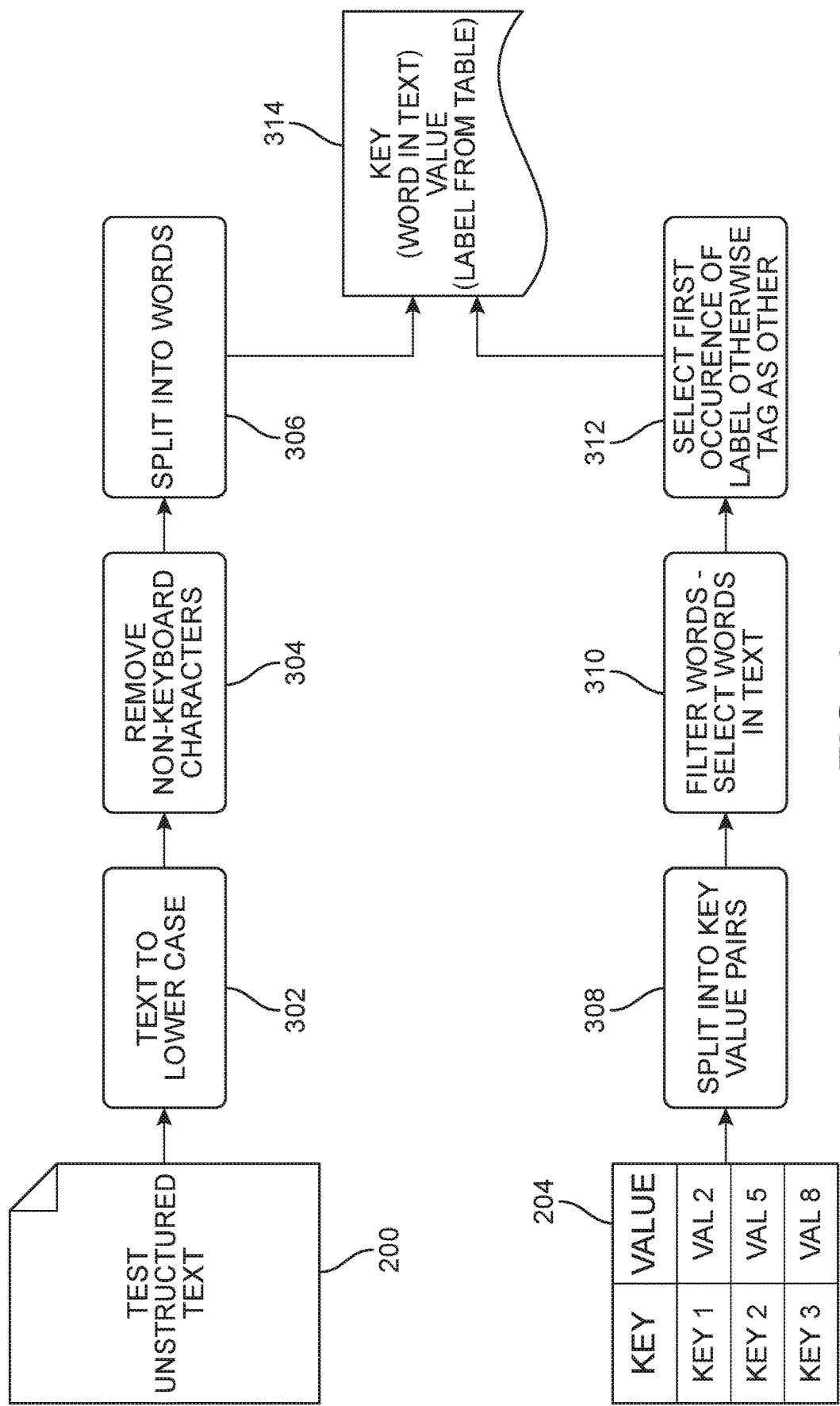
FIG. 3 is a schematic diagram of preprocessing details for an embodiment of a system for transforming unstructured text into structured form.

FIG. 2 is a schematic diagram of an embodiment of a process used to train a system for transforming unstructured text into structured form. During training, a set of unstructured text 200, including one or more word sequences (e.g., sentences or phrases), is provided as input to a text preprocessing module 202. Text preprocessing module 202 may preprocess word sequences in set of unstructured text 200. In some embodiments, preprocessing the word sequences may include converting words or phrases in set of unstructured text 200 into embeddings. For example, pre-trained word vectors, such as GloVe, may be used to convert words or phrases into vectors. In such embodiments, preprocessing the word sequences in set of unstructured text 200 may include initializing the words or phrases to GloVe embeddings and randomly initializing character embeddings. In some embodiments, preprocessing the word sequences in set of unstructured text 200 may include randomly initializing POS tags corresponding to the words. FIG. 3 shows other details of preprocessing set of unstructured text 200. For example, FIG. 3 shows preprocessing set of unstructured text 200 as including changing all of the letters in the words to lowercase (operation 302), removing non-keyboard characters (operation 304), and splitting the word sequences into individual words (operation 306).

A set of structured data 204 corresponding to set of unstructured text 200 is provided as input to a structured data preprocessing module 206. Structured data preprocessing module 206 may preprocess set of structured data 204 by removing extra information, e.g., punctuation and non-alphanumeric characters, and words lacking a label, e.g., labels tagged as "none," Additionally or alternatively, structured data preprocessing module 206 may preprocess words in set of structured data 204. In some embodiments, preprocessing the words may include converting words in set of structured data 204 into embeddings. For example, pre-trained word vectors, such as GloVe, may be used to convert words into vectors. In such embodiments, preprocessing the words in set of structured data 204 may include initializing the words to GloVe embeddings and randomly initializing character embeddings, FIG. 3 shows other details of preprocessing set of structured data 204. For example, FIG. 3 shows preprocessing set of structured data 204 as including splitting the data into key value pairs (operation 308), filtering words (operation 310), and selecting the first occurrence of the label and otherwise tagging a word with the label of "other" (operation 312).

The results of preprocessing set of unstructured text 200 and set of structured data 204 may be saved in a database 208. These results may be used to train machine learning model 210 to transform unstructured text into structured form. Training results in a trained model 212 that is capable of receiving unstructured text 214 as input, processing the unstructured text, and then outputting structured data 216. The results of preprocessing set of unstructured text 200 and set of structured data 204 may include preprocessing output 314 that may be saved in database 208. Preprocessing output 314 may include a key pair including a key, e.g., word or phrase in text, and a corresponding value, e.g., a label from a table.

Figure 4:
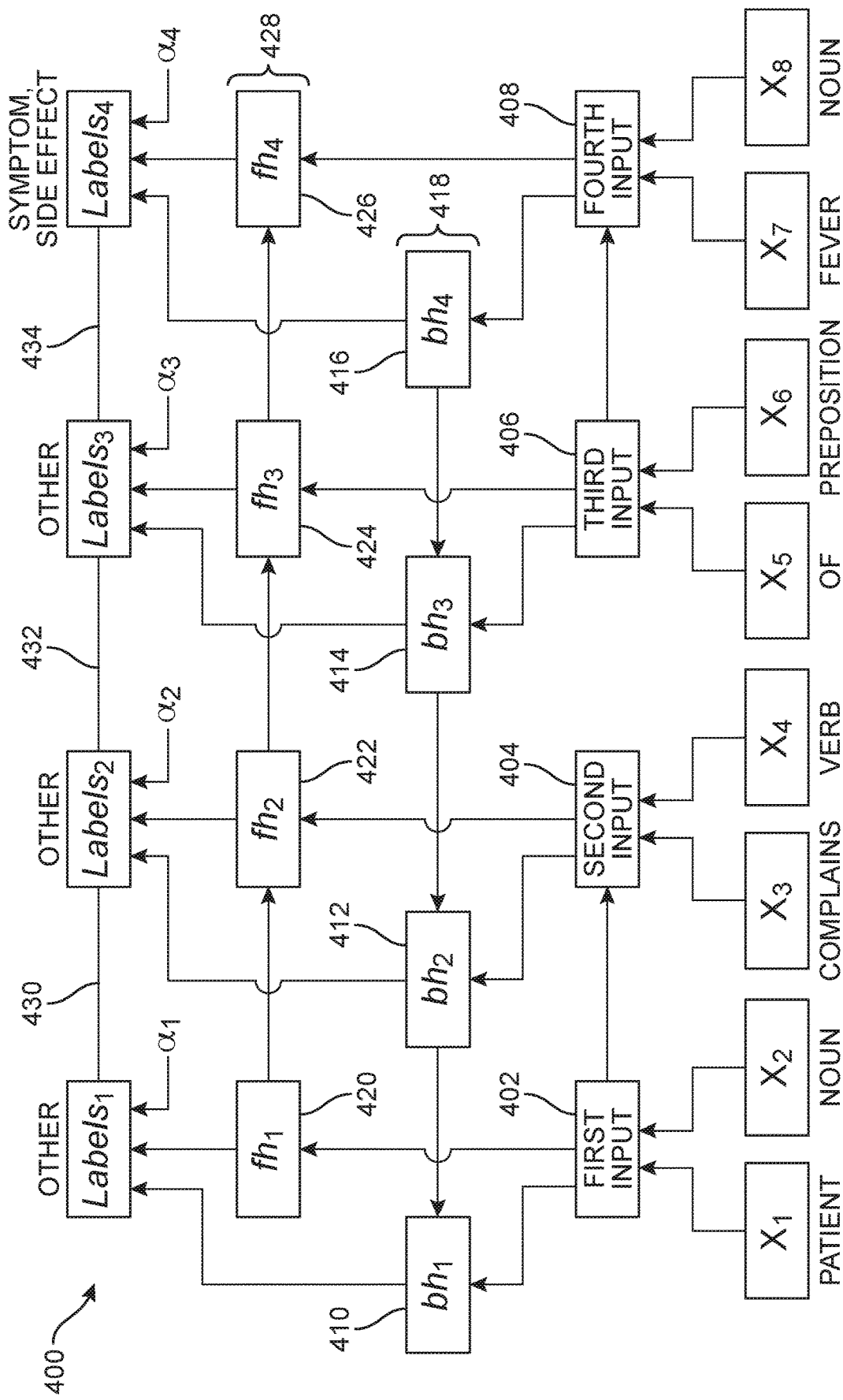
FIG. 4 is a schematic diagram of an embodiment of a system for transforming unstructured text into structured form.

FIG. 4 is a schematic diagram of an embodiment of a system for transforming unstructured text into structured form 400 (or system 400), along with an example of input (first input, second input, third input, and fourth input) and output (labels$_i$). The system for transforming unstructured text into structured form may include a bidirectional RNN. For example, system 400 has a bidirectional RNN. A bidirectional RNN is a type of artificial neural network used to process sequences of inputs. Rather than having inputs that are independent of outputs, as in traditional neural networks, bidirectional RNNs use previous output as input into a subsequent process. The bidirectional nature of the RNN reads two different orderings of the word sequence, which improves the accuracy with which the words or phrases input into the RNN are labeled. In some embodiments, the bidirectional RNN may be one of a long short-term memory ("LSTM") and a gated recurrent unit ("GRU").

In some embodiments, the bidirectional RNN has a first hidden layer in which the word sequence is processed in a backward time order and generates a sequence of hidden state representations ($bh_T, \ldots, bh_1$). For example, as shown in FIG. 4, the bidirectional RNN has a first hidden layer 418 in which the word sequence is processed in a backward time order and generates a sequence of hidden state representations $bh_4$, $bh_3$, $bh_2$, and $bh_1$, which are represented by reference numbers 410, 412, 414, and 416, respectively. In some embodiments, the bidirectional RNN has a second hidden layer in which the word sequence is processed in a forward time order and generates a sequence of hidden state representations ($fh_1, \ldots, fh_T$). For example, in the embodiment shown in FIG. 4, the bidirectional RNN has a second hidden layer 428 in which the word sequence is processed in a forward time order and generates a sequence of hidden state representations $fh_1$, $fh_2$, $fh_3$, and $fh_4$, which are represented by 420, 422, 424, and 426, respectively.

In the embodiment shown in FIG. 4, each word of the word sequence and corresponding POS received by bidirectional RNN is represented by $X_i$. For example, in this embodiment where a medical practitioner writes, "patient complains of fever", $X_1$ is "patient", $X_2$ is "noun" (the POS corresponding to "patient"), $X_3$ is "complains", $X_4$ is "verb" (the POS corresponding to "complains"), $X_5$ is "of", $X_6$ is "preposition" (the POS corresponding to "of"), $X_7$ is "fever", and $X_8$ is "noun" (the POS corresponding to "fever"). It is understood that the POS tags may be determined by the particular tagger used to generate POS tags. It is also understood that $X_1$ through $X_8$ is converted into a word embedding before being passed to the bidirectional RNN as input. Each of the words of the word sequence and corresponding POS aligns with the backward time order hidden state representations and the forward time order hidden state representations. For example, as shown by arrows in the embodiment of FIG. 4, $X_1$ and $X_2$ are concatenated as first input 402 and aligned with both $bh_1$ and $fh_1$; $X_3$ and $X_4$ are concatenated as second input 404 and aligned with both $bh_2$ and $fh_2$; $X_5$ and $X_6$ are concatenated as third input 406 and aligned with both $bh_3$ and $fh_3$; and $X_7$ and $X_8$ are concatenated as fourth input 408 and aligned with both $bh_4$ and $fh_4$. The structure of the bidirectional RNN causes the bidirectional RNN to pass information about the past and future of the word sequence to the next layer (e.g., the output layer). For example, backward time order hidden state representation $bh_1$ receives first input 402 and backward time order hidden state representation $bh_2$, and forward time order hidden state representation $fh_1$ receives first input 402. The output from both backward time order hidden state representation $bh_1$ and forward time order hidden state representation $fh_1$ is concatenated and passed to the next layer with attention $\alpha_1$. In this case, the output of the bidirectional RNN called "Labels$_1$" is the single label of "other."

Backward time order hidden state representation $bh_2$ receives second input 404 and backward time order hidden state representation $bh_3$, and forward time order hidden state representation $fh_2$ receives second input 404. The output from both backward time order hidden state representation $bh_2$ and forward time order hidden state representation $fh_2$ is concatenated and passed to the next layer with attention $\alpha_2$. In this case, the output of the bidirectional RNN called "Labels$_2$" is the single label of "other."

Backward time order hidden state representation $bh_3$ receives third input 406 and backward time order hidden state representation $bh_4$, and forward time order hidden state representation $fh_3$ receives third input 406. The output from both backward time order hidden state representation $bh_3$ and forward time order hidden state representation $fh_2$ is concatenated and passed to the next layer with attention $\alpha_3$. In this case, the output of the bidirectional RNN called "Labels$_3$" is the single label of "other."

Backward time order hidden state representation $bh_1$ receives fourth input 408, and forward time order hidden state representation $fh_4$ receives fourth input 408 and backward time order hidden state representation $fh_3$. The output from both backward time order hidden state representation $bh_4$ and forward time order hidden state representation $fh_4$ is concatenated and passed to the next layer with attention $\alpha_4$. In this case, the output called Labels$_4$, includes two labels, "symptom" and "side effect."

Figure 5:
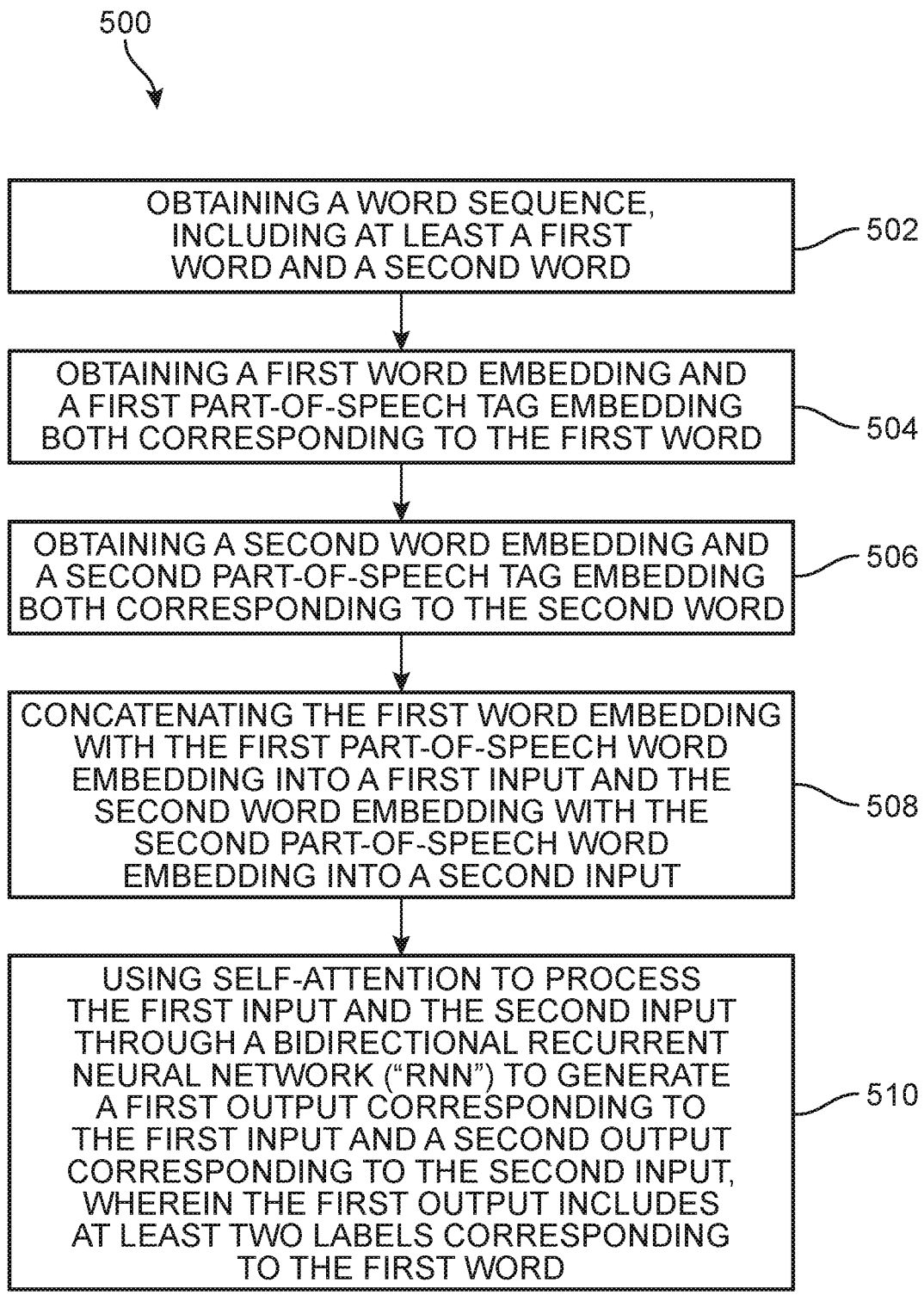
FIG. 5 is a schematic diagram of an embodiment of a method of transforming unstructured text into structured form.

In some embodiments, conditional random fields ("CRF") exist between the labels. For example, first line 430 between Labels$_1$ and Labels$_2$ represents CRF. Second line 432 between Labels$_2$ and Labels; represents CRF, Third line 434 between Labels$_3$ and Labels$_4$ represents CRF, FIG. 5 is a schematic diagram of an embodiment of a method of transforming unstructured text into structured form 500 (or method 500). The method of transforming unstructured text into structured form may include obtaining a word sequence, including at least a first word and a second word. For example, method 500 includes obtaining a word sequence, including at least a first word and a second word (operation 502). In some embodiments, the word sequence may be a sentence. For example, as shown in the embodiment of FIG. 4, the word sequence includes the following sentence: "patient complains of fever." In some embodiments, the word sequence may include a first word and a second word provided in a forward direction in which the first word comes before the second word. For example, as shown in the embodiment of FIG. 4, in the word sequence the word "of" comes before "fever." In some embodiments, the word sequence may include more than two words. For example, in one embodiment, the word sequence may include three words. In the embodiment of FIG. 4, the word sequence includes four words. In another example, in one embodiment, the word sequence may include between three and twenty words.

In some embodiments, the word sequence may include a number. For example, as shown in FIG. 1, a word sequence may be the following sentence: "John Thomas, a 74 year old, had been feeling fatigued since few days." In this example, the word sequence includes 13 words, including the number "74," which is considered a word in unstructured text 100 in FIG. 1 that is transformed into structured format 102. In structured format 102, "74" corresponds with the label "age" because unstructured text 100 implies that "74" is the patient's age.

The method of transforming unstructured text into structured form may include obtaining a word embedding and a POS tag embedding both corresponding to the word for each word in a sequence. For example, method 500 includes obtaining a first word embedding and a first POS tag embedding both corresponding to the first word (operation 504). In another example, in the embodiment of FIG. 4, a word embedding and a POS tag embedding is obtained for each word in the sequence. In this example, as discussed above, a word embedding and a POS tag embedding is obtained for each of the words in the word sequence, "patient complains of fever." In some embodiments, obtaining a first word embedding may include converting the first word into an embedding. For example, pre-trained word vectors, such as GloVe, may be used to convert words into vectors. In some embodiments, training of the system for transforming unstructured text into structured form may include initializing words in the training vocabulary to GloVe embeddings and randomly initializing character embeddings. In some embodiments, obtaining the first POS tag embedding may include randomly initializing the first POS tag.

In some embodiments, the method of transforming unstructured text into structured form may include obtaining a second word embedding and a second POS tag embedding both corresponding to the second word. For example, method 500 includes obtaining a second word embedding and a second POS tag embedding both corresponding to the second word (operation 506). Obtaining a second word embedding and a second POS tag embedding both corresponding to the second word may be performed in the same ways discussed above with respect to obtaining a first word embedding and a first POS tag embedding both corresponding to the first word.

The method of transforming unstructured text into structured form may include concatenating the first word embedding with the first POS word embedding into a first input and the second word embedding with the second POS word embedding into a second input. For example, method 500 includes concatenating the first word embedding with the first POS word embedding into a first input and the second word embedding with the second POS word embedding into a second input (operation 508). In another example, as discussed above with respect to FIG. 4, $X_1$ and $X_2$ are concatenated as first input; $X_3$ and $X_4$ are concatenated as second input; $X_5$ and $X_6$ are concatenated as third input; and $X_7$ and $X_8$ are concatenated as fourth input.

The method of transforming unstructured text into structured form may include using self-attention to process the first input and the second input through a bidirectional RNN to generate a first output corresponding to the first input and a second output corresponding to the second input, wherein the first output includes at least two labels corresponding to the first word. For example, method 500 includes using self-attention to process the first input and the second input through a bidirectional RNN to generate a first output corresponding to the first input and a second output corresponding to the second input, wherein the first output includes at least two labels corresponding to the first word (operation 510). In another example, as discussed above with respect to FIG. 4, backward time order hidden state representation $bh_1$ receives first input 402 and backward time order hidden state representation $bh_2$, and forward time order hidden state representation $fh_1$ receives first input 402, and the output from both backward time order hidden state representation $bh_1$ and forward time order hidden state representation $fh_1$ is concatenated and passed to the next layer with attention $\alpha_1$.

In another example, as discussed above with respect to FIG. 4, backward time order hidden state representation $bh_2$ receives second input 404 and backward time order hidden state representation $bh_3$, and forward time order hidden state representation $fh_2$ receives second input 404 and the output from both backward time order hidden state representation $bh_2$ and forward time order hidden state representation $fh_2$ is concatenated and passed to the next layer with attention $\alpha_2$.

In another example, as discussed above with respect to FIG. 4, backward time order hidden state representation $bh_3$ receives third input 406 and backward time order hidden state representation $bh_4$, and forward time order hidden state representation $fh_3$ receives third input 406 and the output from both backward time order hidden state representation $bh_3$ and forward time order hidden state representation $fh_3$ is concatenated and passed to the next layer with attention $\alpha_3$.

In another example, as discussed above with respect to FIG. 4, backward time order hidden state representation $bh_4$ receives fourth input 408 and passes this information to the output called $Labels_4$, and forward time order hidden state representation $fh_4$ receives fourth input 408 and backward time order hidden state representation $fh_3$ and the output from both backward time order hidden state representation $bh_4$ and forward time order hidden state representation $fh_4$ is concatenated and passed to the next layer with attention $\alpha_4$.

While the embodiment of FIG. 4 shows the output as including one or two labels per word, it is understood that more than two labels may be assigned to a word. For example, in some embodiments, a word may include three to 10 labels.

At the output layer, a Sigmoid function is used to normalize each of the label prediction scores between 0 and 1. Using the Sigmoid Function compresses the difference in the scores into a number that can be more easily compared. The prediction scores are based on the probability that a word corresponds to a label. In other words, the prediction score indicates the accuracy of a prediction that a word corresponds to a label. For example, a prediction score of 0.9 means that there is 90% probability that a word fits within a particular label. The higher the prediction score of a label, the more likely the label corresponds to a word. Each probability that a word fits with a label is independent of the probability that the same word fits with another label. Such a relationship between probabilities allows more than one label to be predicted for each word.

In some embodiments, a custom loss equation is used to perform back-propagation to adjust the weights of the bidirectional RNN. The custom loss equation is as follows:

$$HL_{diff} = \text{average}(y_t * (1-y_p) + (1-y_t) * y_p),$$

where $y_t$ is the vector of true labels and $y_p$, is the vector of independent probabilities of predicted labels. This custom loss equation is differentiable.

In an example, a word has true labels [1,0,0,1] and the model predicts the labels [0.9,0.1,0,2,0.9], then loss in this case is computed as avg([1,0,0,1]*[0.1,0.9,0.8,0.1] [0,1,1,0] *[0.9,0.1,0.2,0,9]) or avg(0.1+0.1+0.1+0.2) or 0.125. It is a loss value, so better models have a lower loss.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of transforming unstructured text into structured form, comprising:
    obtaining a word sequence, including at least a first word and a second word;
    obtaining a first word embedding and a first part-of-speech ("POS") tag embedding both corresponding to the first word;
    obtaining a second word embedding and a second POS tag embedding both corresponding to the second word;
    concatenating the first word embedding with the first POS word embedding into a first input and the second word embedding with the second POS word embedding into a second input;
    using self-attention to process the first input and the second input through a bidirectional recurrent neural network ("RNN") to generate a first output corresponding to the first input and a second output corresponding to the second input, wherein the first output includes at least two labels corresponding to the first word;
    using a loss to perform back-propagation to adjust weights of the bidirectional RNN, wherein the loss is based on both the vector of true labels and the vector of independent probabilities of predicted labels; and
    wherein the loss is $HL_{diff}$, and wherein $$HL_{diff} = \text{average}(y_t * (1-y_p) + (1-y_t) * y_p),$$

where $y_t$ is the vector of true labels and $y_p$ is the vector of independent probabilities of predicted labels.

2. The method of claim 1, wherein the first output includes three labels corresponding to the first word.

3. The method of claim 1, wherein the probability that the first word fits with a label is independent of the probability that the first word fits with another label.

4. The method of claim 1, wherein the bidirectional RNN includes one of a long short-term memory ("LSTM") and a gated recurrent unit ("GRU") that controls how information is passed down from layer to layer of the bidirectional RNN.

5. The method of claim 1, further comprising saving a key pair including the first word and the first output in a database.

6. The method of claim 1, further comprising saving a key pair including the second word and the second output in a database.

7. The method of claim 1, wherein at an output layer of the bidirectional RNN, a Sigmoid function is used to normalize each of the label prediction scores between 0 and 1.

8. A non-transitory computer-readable medium storing software comprising instructions executable by one or more computers which, upon such execution, cause the one or more computers to transform unstructured text into structured form by:
    obtaining a word sequence, including at least a first word and a second word;
    obtaining a first word embedding and a first part-of-speech ("POS") tag embedding both corresponding to the first word;
    obtaining a second word embedding and a second POS tag embedding both corresponding to the second word;
    concatenating the first word embedding with the first POS word embedding into a first input and the second word embedding with the second POS word embedding into a second input;
    using self-attention to process the first input and the second input through a bidirectional recurrent neural network ("RNN") to generate a first output corresponding to the first input and a second output corresponding to the second input, wherein the first output includes at least two labels corresponding to the first word;
    using a loss to perform back-propagation to adjust weights of the bidirectional RNN, wherein the loss is based on both the vector of true labels and the vector of independent probabilities of predicted labels; and
    wherein the loss is $HL_{diff}$, and wherein $$HL_{diff} = \text{average}(y_t * (1-y_p) + (1-y_t) * y_p),$$

where $y_t$ is the vector of true labels and $y_p$ is the vector of independent probabilities of predicted labels.

9. The non-transitory computer-readable medium storing software of claim 8, wherein the first output includes three labels corresponding to the first word.

10. The non-transitory computer-readable medium storing software of claim 8, wherein the probability that the first word fits with a label is independent of the probability that the first word fits with another label.

11. The non-transitory computer-readable medium storing software of claim 8, wherein the bidirectional RNN includes one of a long short-term memory ("LSTM") and a gated recurrent unit ("GRU") that controls how information is passed down from layer to layer of the bidirectional RNN.

12. The non-transitory computer-readable medium storing software of claim 8, wherein the instructions, upon execution, further cause the one or more computers to transform unstructured text into structured form by:
    saving a key pair including the first word and the first output in a database.

13. The non-transitory computer-readable medium storing software of claim 8, wherein the instructions, upon execution, further cause the one or more computers to transform unstructured text into structured form by:
    saving a key pair including the second word and the second output in a database.

14. The non-transitory computer-readable medium storing software of claim 8, wherein at an output layer of the bidirectional RNN, a Sigmoid function is used to normalize each of the label prediction scores between 0 and 1.

15. A system for transforming unstructured text into structured form, comprising:

one or more computers and one or more storage devices storing instructions that are operable, when executed by the one or more computers, to cause the one or more computers to:
- obtain a word sequence, including at least a first word and a second word;
- obtain a first word embedding and a first part-of-speech ("POS") tag embedding both corresponding to the first word;
- obtain a second word embedding and a second POS tag embedding both corresponding to the second word;
- concatenate the first word embedding with the first POS word embedding into a first input and the second word embedding with the second POS word embedding into a second input;
- use self-attention to process the first input and the second input through a bidirectional recurrent neural network ("RNN") to generate a first output corresponding to the first input and a second output corresponding to the second input, wherein the first output includes at least two labels corresponding to the first word;

using a loss to perform back-propagation to adjust weights of the bidirectional RNN, wherein the loss is based on both the vector of true labels and the vector of independent probabilities of predicted labels; and wherein the loss is $HL_{diff}$, and wherein $$HL_{diff}=\text{average}(y_t*(1-y_p)+(1-y_t)*y_p),$$

where $y_t$ is the vector of true labels and $y_p$ is the vector of independent probabilities of predicted labels.

16. The system of claim 15, wherein the first output includes three labels corresponding to the first word.

17. The system of claim 15, wherein the probability that the first word fits with a label is independent of the probability that the first word fits with another label.

18. The system of claim 15, wherein the bidirectional RNN includes one of a long short-term memory ("LSTM") and a gated recurrent unit ("GRU") that controls how information is passed down from layer to layer of the bidirectional RNN.

19. The system of claim 15, wherein the stored instructions are further operable, when executed by the one or more computers, to cause the one or more computers to:
- save a key pair including the first word and the first output in a database.

20. The system of claim 15, wherein the stored instructions are further operable, when executed by the one or more computers, to cause the one or more computers to:
- save a key pair including the second word and the second output in a database.

* * * * *